United States Patent [19]

Jüntgen et al.

[11] 4,264,339
[45] Apr. 28, 1981

[54] PROCESS FOR THE RECOVERY OF NITROGEN-RICH GASES FROM GASES CONTAINING AT LEAST OXYGEN AS OTHER COMPONENT

[75] Inventors: Harald Jüntgen; Karl Knoblauch; Jürgen Reichenberger; Heinrich Heimbach, all of Essen; Ferdinand Tarnow, Duisburg-Buchholz, all of Fed. Rep. of Germany

[73] Assignee: Bergwerksverband GmbH, Essen, Fed. Rep. of Germany

[21] Appl. No.: 20,710

[22] Filed: Mar. 15, 1979

Related U.S. Application Data

[63] Continuation of Ser. No. 852,039, Nov. 16, 1977, abandoned.

[30] Foreign Application Priority Data

Nov. 18, 1976 [DE] Fed. Rep. of Germany ....... 2652486

[51] Int. Cl.³ ............................................ B01D 53/04
[52] U.S. Cl. .......................................... 55/25; 55/58; 55/68; 55/75
[58] Field of Search .................. 55/25, 26, 58, 62, 68, 55/75

[56] References Cited

U.S. PATENT DOCUMENTS

| | | | |
|---|---|---|---|
| 3,313,091 | 4/1967 | Berlin | 55/75 X |
| 3,738,087 | 6/1973 | McCombs | 55/58 |
| 3,801,513 | 4/1974 | Munzner et al. | 55/75 X |
| 3,891,411 | 6/1975 | Meyer | 55/75 X |
| 3,923,477 | 12/1975 | Armond et al. | 55/25 |
| 4,065,272 | 12/1977 | Armond | 55/75 X |

Primary Examiner—Robert H. Spitzer
Attorney, Agent, or Firm—Michael J. Striker

[57] ABSTRACT

The present process is an improvement of an earlier process wherein a nitrogen enriched gas is obtained from a gas containing oxygen and possibly other components. In that process the feed gas is passed in a continuous flow cycle through an adsorber containing carbonaceous molecular sieve coke followed by evacuation of the adsorber, oxygen and possibly other gas components being adsorbed and the discharged nitrogen-enriched gas being collected until the continually rising oxygen contents thereof reaches a predetermined limit value whereupon the molecular sieve coke is desorbed of the residual gases prior to the next charging cycle. The present improvement is constituted by the feature that the flow of feed gas through the molecular sieve coke is effected at a continually increasing pressure until a terminal pressure of about 3 to 10 bar has been reached.

10 Claims, 1 Drawing Figure

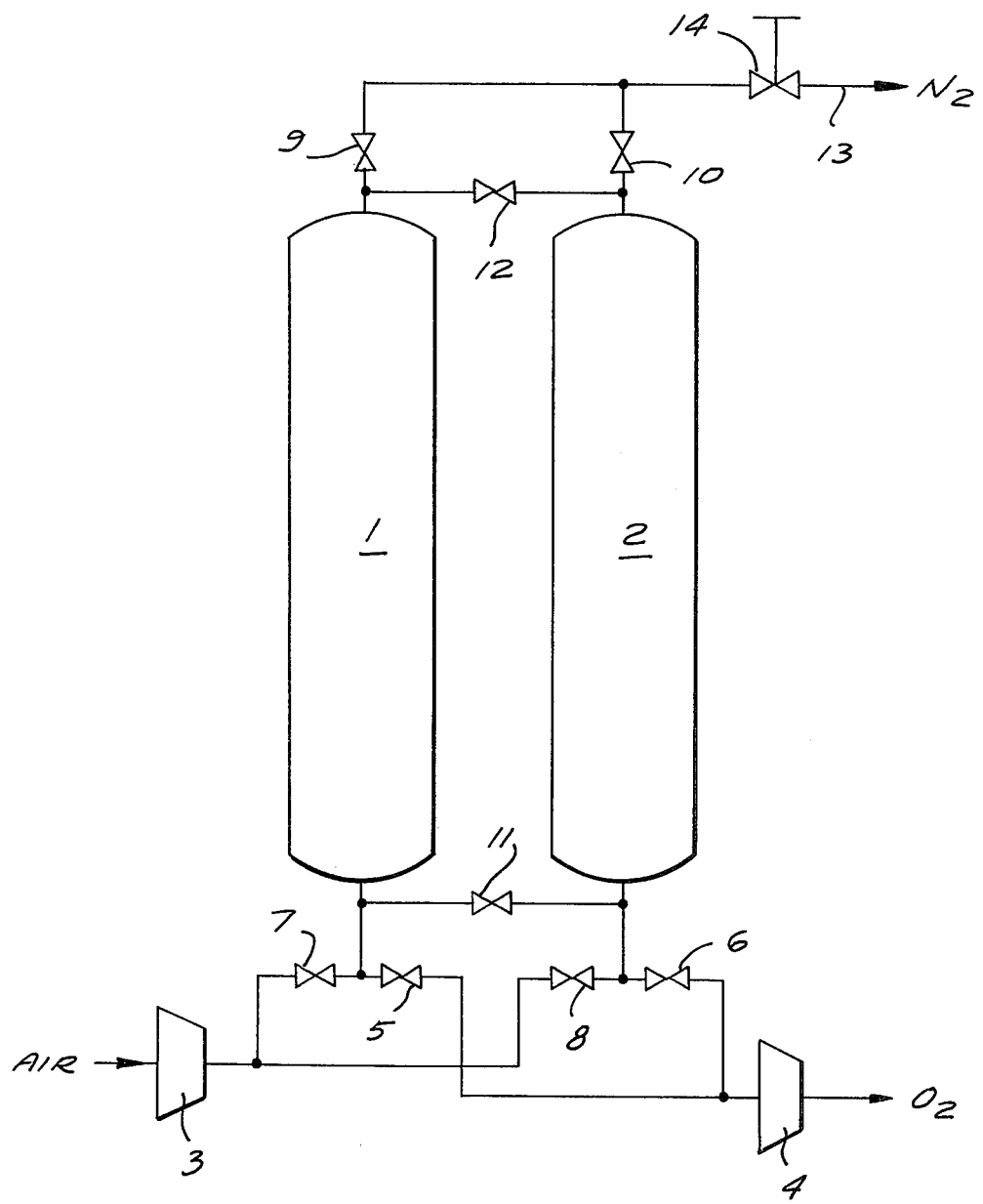

PROCESS FOR THE RECOVERY OF NITROGEN-RICH GASES FROM GASES CONTAINING AT LEAST OXYGEN AS OTHER COMPONENT

This is a continuation of application Ser. No. 852,039, filed Nov. 16, 1977, now abandoned.

BACKGROUND OF THE INVENTION

The present process is an improvement of an earlier process wherein a nitrogen enriched gas is obtained from a gas containing at least oxygen and possibly other components in addition to nitrogen, such as, for instance, air. In the earlier process a carbonaceous molecular sieve coke in an adsorber is evacuated and then charged with nitrogen containing gas in a continuous flow cycle. Principally oxygen is adsorbed by the sieve coke and the discharged nitrogen-rich product gas is collected until its continually rising oxygen contents has reached a predetermined limit value. The charged molecular sieve coke is then desorbed of the residual gases whereupon it can be again charged with nitrogen-rich gases. The evacuation of the molecular sieve coke in this process was normally effected up to a pressure below 120 torr and preferably between 70 and 20 torr and the charging of the adsorber and flow of nitrogen containing gases therethrough was carried out at a constant pressure between 1 and 5 bar.

There was thus obtained a concentration increase of nitrogen in the product gas up to 93 to 99.5%. This result applies to a single step process in two alternatingly charged adsorbers. Only if the process is carried out in two stages with four adsorbers and the nitrogen enriched product gas of the first stage is then again subjected to the same process step is it possible to obtain a concentration of nitrogen in the product gas up to 99.9%. However, the two-stage process is very expensive.

It is therefore an object of the present invention to provide for an improvement of the concentration of nitrogen in the product gas so as to obtain a concentration of 99.9% even with a single-stage process.

SUMMARY OF THE INVENTION

This object is obtained by causing the flow of the feed gas through the molecular sieve coke at a continually increasing pressure up to a terminal pressure of about 3 to 10 bar, preferably 4 to 6 bar.

The initial pressure in this case can be a vacuum, that is about 20 to 120 torr, or in case of a particular embodiment described below, may be at about 1 to 2 bar. This means that only beginning with these pressures starts the charging of the molecular sieve coke at the increasing pressures. Terminal pressures above about 10 bar do not result in any practical advantages.

The novel concept of the invention for practical application means that the nitrogen-containing gas, for instance air, may be passed at one end into the adsorber which is filled with molecular sieve coke, while at the same time a portion of the gas may be discharged at the other end of the adsorber. The discharge valve of the adsorber in this case is adjusted so that during the introduction of air the pressure therein gradually increases to 3 to 10, preferably 4 to 6 bar.

As soon as the oxygen contents in the discharged nitrogen-enriched product gas exceeds the desired limit value of, for instance, 0.1 or 0.5 or 1.0 percent by volume of oxygen the charging step is terminated and the adsorber is switched to the evacuation step.

It has been found that it has no material effect on the successful performance of the process which particular terminal pressure within the range of the invention exists at that point of time where the predetermined oxygen limit value in the nitrogen-enriched product gas is obtained. Essential is only that the charging step is terminated as soon as this oxygen limit value is found to have been reached.

In the process of the invention about one-third to one-tenth of the introduced nitrogen containing gas is discharged during the pumping-in step at the discharge valve as nitrogen-enriched product gas.

The amount of charging of the molecular sieve coke with nitrogen-containing gases depends on the quality of the coke and should be between about 0.04 to 0.07 $N^3/m^3$ coke per second.

Based on air it is possible in this manner without any great effort to obtain nitrogen which contains only about 0.1% by volume of oxygen and traces of water vapor, $CO_2$, CO and most of the argon which is contained in air.

The charging usually requires a time of about 60 to 120 seconds and the process preferably is carried out continuously in two alternatingly charged adsorbers. In this case it is advisable to adjust also the evacuation so that about the same time is necessary for this step as is required for the charging step.

During the evacuation to for instance 20 to 120 torr, air is obtained by the adsorption containing an increased concentration of oxygen which usually is above 30% by volume, for instance on an average between 34 and 40% by volume.

The high concentration of nitrogen obtainable with the process of the invention permits, if desired, to dispense entirely with the separate evacuation of the adsorber and to cause only the residual gases to flow out of the adsorber. This means that the desorption of the residual gases is effected only by depressurization of the adsorber to 1 bar. However, the nitrogen concentration results will be slightly impaired by this approach and will generally reach only 99.7 to 99.8% of nitrogen.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing shows in a diagrammatic representation an installation for practicing the invention.

DETAILES OF THE INVENTION AND PREFERRED EMBODIMENTS

In carrying out the invention with two adsorbers it is preferred to commence the charging of the evacuated or depressurized adsorber with the residual gas of the other adsorber which has just been subjected to the complete charging step. This approach is possible because through the depressurization of a charged adsorber there are in the beginning gases liberated which contain less oxygen than is present in the feed gas such as air. However, the oxygen contents in the discharged residual gas will gradually increase up to an oxygen contents of 60% and more. The average oxygen contents of the residual gases is as indicated usually 30 to 40% by volume.

If an adsorber which is charged with residual gas is connected with an adsorber which has been evacuated or depressurized, air, if such is used as the feed gas, will pass over which has a lower oxygen content than regular air. It is therefore possible to commence the charging of the adsorber by means of a so-called pressure equalization between the charge and the not-yet charged adsorber. Following the pressure equalization there is then effected a depressurization or complete evacuation of the adsorber which had previously been charged. This therefore includes the desorption of the residual gases. On the other hand, the adsorber which, because of pressure equalization, has been freshly charged with the gas passing from one adsorber to the other can be filled with further nitrogen containing gas under the conditions of the invention.

With particular reference to the drawing the process may be described as follows:

Shown in the drawing is an installation adapted for continuous performance of the invention with two parallel adsorbers which are operated at a time lag rhythm. The adsorbers 1 and 2 are connected at the top and at the bottom directly via the valves 11 and 12. The nitrogen-enriched product gas is discharged from the adsorbers via the valves 9 and 10.

The introduction of the nitrogen-containing gases is effected by means of a blower 3 and through the valves 7 and 8 into the adsorbers 1 and 2. The discharge of the residual gases from the adsorber 1 is effected via valve 5 and from the adsorber 2 via valve 6 by means of a vacuum pump 4.

The operation of the installation after starting is as follows:

At first residual gases are permitted to pass from the adsorber 2 into the evacuated adsorber 1 through opening of the valves 11 and 12. Then air is passed through the adsorber 1 after closing of the valves 11 and 12 via the blower 3 and the valve 7. This air then leaves the adsorber in the form of a nitrogen-enriched product gas via the adjustable valve 9.

As soon as the oxygen contents has been reached, for instance 0.2% by volume in the nitrogen-enriched product gas, the valve 9 is closed and instead the valve 8 is opened so as to permit the air now to flow through the adsorber 2.

The adsorber 2 has been evacuated during the preceding charging of the adsorber 1. This evacuation was effected via the valve 6 and the vacuum pump 4. Before air is permitted to enter the adsorber 2 via the valve 8 residual gas is caused to flow from the adsorber 1 through the valves 11 and 12 until a pressure equalization is effected in the adsorber 2.

The adsorber 2 is then charged with the same amounts of air as the adsorber 1 until again the limit value of oxygen contents in the gas discharged from the valve 10 is reached.

The virtually oxygen-free nitrogen leaves the installation via the duct 13. The amount of discharge of nitrogen-enriched product gas can be adjusted by means of valve 14.

The following specific examples will further illustrate the invention.

EXAMPLE 1

Two adsorbers filled with molecular sieve coke and having a contents of 0.5 m$^3$, each, are alternatingly evacuated to 70 torr in a cyclic operation and are in each case charged for 58 seconds with 1.5 Nm$^3$ air. The pressure in the adsorber after pressure equalization between the two adsorbers at 1.5 bar is then permitted to increase continually up to a terminal pressure of 3.5 bar at the end of the charging step. The discharged product gas in this case increases continuously in amount. At the discharge end of each adsorber there is obtained 0.4 Nm$^3$ nitrogen with an oxygen content of 0.5% by volume.

The residual gas which is obtained in the evacuation step has an average oxygen concentration of 32% by volume.

EXAMPLE 2

Two adsorbers filled with molecular sieve coke and having a contents of 1 m$^3$ each are alternatingly evacuated in a cyclic operation for about 90 seconds to 100 torr and are then charged with 4 Nm$^3$ each. After pressure equalization between the two adsorbers the pressure is then permitted to rise continuously from 2 bar as existing at the pressure equalization to a pressure of 4.5 bar at the end of the charging step. There are thus obtained in each adsorber 2.5 Nm$^3$ of nitrogen-enriched product gas.

The nitrogen product gas has a mean nitrogen concentration of 99.8 to 99.9% by volume. The residual gas has a mean oxygen concentration of 35% by volume.

EXAMPLE 3

Two adsorbers filled with molecular sieve coke and having a contents of 4 Nm$^3$ each are alternatingly depressurized to normal pressure in a cyclic operation and in each case charged for 114 seconds with 30 Nm$^3$ air each. After pressure equalization between the two adsorbers to a pressure of 3 bar the pressure in the adsorber is then permitted to rise continuously up to a terminal pressure of 6 bar at the end of the charging step. The discharged product gas amount likewise increases continuously.

At each adsorber there are obtained at the discharge end 3.0 Nm$^3$ nitrogen having an oxygen content of 0.4% by volume.

The amount of the residual gas is 27 Nm$^3$ with a mean oxygen concentration of 26% by volume.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a process for the recovery of nitrogen by passing a feed gas containing in addition to the nitrogen, oxygen and trace pollutants through one of two adsorbers, each adsorber containing a carbonaceous molecular sieve for adsorbing the oxygen and trace pollutants, adsorbing the oxygen and trace pollutants from said gas, discharging the treated gas and desorbing the molecular sieve of oxygen and trace pollutants, the improvement for obtaining substantially pure nitrogen gas in a single stage comprising utilizing two alternatingly charged adsorbers, said adsorption and desorption steps being effected by the adsorbers to the same repeated pressure cycle including a pressure continuously increasing up to about 3–10 bar by the feed gas which is charged in an amount of 0.04 to 0.07 $Nm^3/m^3$ molecular sieve per second for the adsorption step while simultaneously discharging substantially pure nitrogen from the outlet end of the adsorber and a pressure reduced to about atmospheric or less for the desorption step while the feed gas flow into this adsorber is stopped during the desorption time, the shutting off of said adsorption step from said desorption step being effected when the oxygen content in the nitrogen gas being discharged amounts to 0.1–1.0% by volume whereupon the adsorber is then subjected to the decreased pressure to effect a regeneration of the adsorbent by desorption of the oxygen and trace pollutants therefrom, wherein the adsorption step is being carried out in one of said adsorbers while the desorption step is being carried out in said other adsorber.

2. An improvement according to claim 1, wherein said feed gas is introduced into said adsorber for about 60–120 seconds.

3. An improvement according to claim 1, wherein said nitrogen gas discharged from said adsorber contains about 0.1% by volume oxygen and only traces of said other impurities.

4. An improvement according to claim 1, wherein said feed gas is air.

5. An improvement according to claim 1, wherein said pressure is increased in said adsorption stage to about 4–6 bar.

6. An improvement according to claim 1, wherein two parallel arranged of adsorbers are employed.

7. An improvement according to claim 1, wherein two alternately charged adsorbers are employed.

8. An improvement according to claim 7, wherein one adsorber is being depressurized for desorption while the other is being pressurized for adsorption.

9. An improvement according to claim 7, wherein prior to desorption a pressure equalization is effected between said two adsorbers.

10. An improvement according to claim 9, wherein the residual gas from one adsorber is introduced into the other of said adsorbers.

* * * * *